United States Patent [19]

Jones et al.

[11] Patent Number: 4,581,305

[45] Date of Patent: Apr. 8, 1986

[54] ELECTROCHEMICAL CELL

[75] Inventors: W. Kinzy Jones, Pembroke Pines; Harshad Tataria, Miami, both of Fla.

[73] Assignee: Cordis Corporation, Miami, Fla.

[21] Appl. No.: 623,965

[22] Filed: Jun. 25, 1984

[51] Int. Cl.$^4$ .......................................... H01M 10/48
[52] U.S. Cl. ..................................... 429/91; 429/194; 429/197; 429/220
[58] Field of Search ................... 429/90, 91, 194, 197, 429/220

[56] References Cited

U.S. PATENT DOCUMENTS

| | | | |
|---|---|---|---|
| 2,942,052 | 6/1960 | Bourke et al. | 136/6 |
| 3,450,570 | 6/1969 | Root | 136/120 |
| 3,542,601 | 11/1970 | Gabano | 136/155 |
| 3,907,597 | 9/1975 | Mellors | 136/100 R |
| 3,941,612 | 3/1976 | Steunenberg | 136/6 LF |
| 3,959,012 | 5/1976 | Liang et al. | 136/6 L |
| 4,025,700 | 5/1977 | Fagan, Jr. et al. | 429/91 |
| 4,139,680 | 2/1979 | Schlaikjer | 429/196 X |
| 4,144,382 | 3/1979 | Takeda et al. | 429/91 |
| 4,247,606 | 1/1981 | Uetani et al. | 429/91 |
| 4,259,415 | 3/1981 | Tamura et al. | 429/90 |
| 4,293,622 | 10/1981 | Marincic et al. | 429/50 |
| 4,371,592 | 2/1983 | Gabano | 429/91 |
| 4,376,810 | 3/1983 | Takeda et al. | 429/90 |
| 4,388,380 | 6/1983 | DeHaan et al. | 429/91 |
| 4,410,609 | 10/1983 | Peled et al. | 429/105 |
| 4,418,129 | 11/1983 | Goebel | 429/91 |
| 4,421,833 | 12/1983 | Zayatz | 429/101 |

Primary Examiner—Charles F. LeFevour
Attorney, Agent, or Firm—Henry W. Collins; Thomas R. Vigil

[57] ABSTRACT

The electrochemical cell comprises an outer conductive housing, an anode material within the housing, a cathode material within the housing, and porous insulating means separating the anode material from the cathode material, and an electrolyte inside the housing and within the porous insulating means. The cathode material is a mixture of a metallic halogen compound and a metallic sulfide compound less electrochemically reactive with the anode material than the metallic halogen compound. The metallic halogen compound and the less electrochemically reactive metallic sulfide compound are mixed in a proportion whereby a first voltage potential can be developed between the metallic halogen compound and the anode material until the metallic halogen compound is depleted so that a second voltage potential different than the first voltage potential can be developed between the less reactive metallic sulfide compound and the anode material after the metallic halogen compound is depleted in order to indicate depletion of the metallic halogen compound and the approaching end of life of the cell.

6 Claims, 2 Drawing Figures

ELECTROCHEMICAL CELL

BACKGROUND OF THE INVENTION

1. Field of the Invention

The present invention relates to an electrochemical cell which has a cathode material comprising a mixture of a cupric halogen compound and a cupric sulfide compound so that a voltage drop will be indicated when the cupric halogen compound has been completely reduced thereby to indicate depletion of the cupric halogen compound and the approaching end of life of the cell.

2. Description of the Prior Art

Heretofore, various electrochemical cells have been proposed which have various cathode material mixtures, such as a cupric halogen compound mixed with a carbon powder, but which do not provide a low impedance cell capable of demonstrating a sufficient voltage drop in order to indicate the approaching end of life of an electrochemical cell.

Examples of such previously proposed electrochemical cells are disclosed in the following U.S. Patents:

| U.S. Pat. No. | Patentee |
|---|---|
| 3,450,570 | Root |
| 3,542,601 | Gabano |
| 3,907,597 | Mellors |
| 3,941,612 | Steunenberg |
| 3,959,012 | Liang et al. |
| 4,410,609 | Peled et al. |

The Root U.S. Pat. No. 3,450,570 discloses a method of producing a semi-conductive electronegative element of a battery which is produced by heating a finely divided mixture of cupric halide and sulfur in the proportion by weight of one part of cupric halide to 0.03 to 0.5 part of sulfur. The cupric halide may be, for example, cupric fluoride, and cupric sulfide or finely divided copper may be incorporated with some free sulfur into the mixture prior to heating. Accordingly, an electronegative element having a solid compact matrix is produced which has good conductivity, relatively low internal resistance, and which prevents the migration of finely dispersed copper particles from going toward the electro-positive element in a discharge of a battery utilizing such electro-negative elements.

The Gabano U.S. Pat. No. 3,542,601 discloses an electrochemical generator with a non-aqueous electrolyte which includes a halide or sulfide cathode such as a cupric halide or cupric sulfide, and an anode having a strongly electro-negative metal such as an alkali or alkaline earth metal. The non-aqueous electrolyte has a high solvating power and consists of an organic solvent of high solvating power which is a heterocyclic, saturated compound, selected from the group consisting of tetrahydrofuran and tetrahydropyran, together with lithium perchlorate dissolved therein.

The Mellors U.S. Pat. No. 3,907,597 discloses a nonaqueous cell having an electrolyte containing sulfolane or an alkyl-substituted derivative thereof. The nonaqueous cell includes a highly active metal anode, such as lithium, a solid cathode, such as cupric fluoride or copper sulfide, and a liquid organic electrolyte consisting of sulfolane or its liquid alkyl-substituted derivative in combination with a co-solvent.

The Steunenberg U.S. Pat. No. 3,941,612 discloses a cathode composition for an electrochemical cell which includes a negative electrode containing an alkaline metal such as lithium, and an electrolyte of molten salt containing ions of the alkaline metal, and a positive electrode containing a mixture of metallic sulfides. The positive electrode composition is contained within a porous structure that permits permeation of the molten electrolyte and includes a mixture of about 5%-30% by weight cupric sulfide and ferric sulfide.

The Liang et al. U.S. Pat. No. 3,959,012 discloses an electrolyte cell containing a lithium anode, a solid electrolyte of the lithium halide type, and a cathode active material consisting of a mixture of a metal halide and at least one metal chalcogenide. The metal halide is selected from the group comprising lead, silver, copper, antimony, mercury, arsenic, bismuth, chromium, iron, cobalt, nickel, molybdenum and tin. The metal chalcogenide is selected from the group comprising the sulfides, selenides, and tellurides.

The Peled et al. U.S. Pat. No. 4,410,609 discloses an electrochemical cell which includes an anode consisting of lithium, sodium, or a dischargeable alloy of lithium or sodium, and an inert porous cathodic current collector which may be loaded with sulfur, and an electrolyte comprising a solvent mixture which is capable of dissolving a polysulfide in order to attain a concentration of at least 0.01 Mole and to dissolve an electrolyte salt to give a solution of at least 0.1 Mole. The reaction of the anode material with the polysulfide forms a solid electrolyte interphase containing a polysulfide of lithium and sulfur, or sodium and sulfur, so that the concentration of the polysulfide is high enough and the amount of sulfur low enough to result in a predetermined low self-discharge of the cell.

Also it has been proposed to provide in an electrochemical cell a chemical system which will provide a change in electrical potential after the cell has discharged to a predetermined level to provide an indication that the cell is close to the end of its useful life. Examples of such electrochemical cells are disclosed in the following U.S. Patents:

| U.S. Pat. No. | Patentee |
|---|---|
| 2,942,052 | Bourke et al. |
| 4,144,382 | Takeda et al. |
| 4,247,606 | Uetani et al. |
| 4,259,415 | Tamura et al. |
| 4,293,622 | Marincic et al. |
| 4,371,592 | Gabano |
| 4,376,810 | Takeda et al. |
| 4,388,380 | DeHaan et al. |
| 4,418,129 | Goebel |

The Bourke et al. U.S. Pat. No. 2,942,052 discloses a plurality of series connected cells for determining the state of charge of alkaline batteries. The battery cell includes an anode composed of two or more metals and a cathode whereby a first relative high potential difference is produced with respect to the cathode which maintains its potential until the most electro-negative material in its composition has been used up. Thereafter, the negative electrode exhibits a slightly less negative potential difference until the next less electro-negative component in the series has been consumed.

The Takeda et al. U.S. Pat. No. 4,144,382 discloses an alkaline cell having an active cathode material which is a mixture of monovalent silver oxide and graphite or a compound of which the main ingredient is divalent silver oxide, and a mercury-indium-zinc alloy anode. After almost all the zinc of the anode material is exhausted, a small quantity of indium acts as the anode active material so as to continue to supply current for a period of time but at a lower voltage. This voltage drop indicates that the cell is approaching the end of its useful life.

The Uetani et al. U.S. Pat. No. 4,247,606 discloses a silver oxide battery cell which includes a silver oxide positive electrode and a cell body comprising particles of silver oxide and particles of manganese dioxide, each of the particles having a certain particle size distribution. Prior to complete discharge of the cell, a detectable voltage difference is produced as a result of the particle size distribution to indicate the remaining discharge capacity of the cell.

The Tamura et al. U.S. Pat. No. 4,259,415 discloses a battery comprising a negative active material such as lithium, and a positive active material, such as manganese dioxide, which is part of a primary discharge reaction. In a primary discharge reaction, the negative active material acts through a non-aqueous electrolyte and a precursor such as vanadium pentoxide or lead dioxide and produces a subpositive active material which takes part in a secondary discharge reaction. Accordingly, the approaching end of life of the battery is indicated when the positive active material containing the precursor is consumed and the subpositive active material begins the secondary discharge.

The Marincic et al. U.S. Pat. No. 4,293,622 discloses a step cell comprising a lithium anode, a porous carbon cathode, a vinylchloride depolarizer, and an aluminum chloride/lithium chloride solute. The capacity of the cell is determined by the quantity of active components and is limited by the first component to be exhausted, the vinylchloride electrolyte being exhausted first. Accordingly, a step change in the output voltage of the cell is exhibited prior to full cell discharge in order to indicate that the cell should be replaced.

The Gabano U.S. Pat. No. 4,371,592 discloses a primary cell of high energy density in which the anode active material is an alkaline metal and the cathode active material is sulfur oxychloride which simultaneously acts as an electrolyte solvent and which further includes a dissolved salt and a co-solvent. The co-solvent has a reduction potential relative to the alkaline metal that is less than the reduction potential of the sulfur dioxide which comes from the reduction of the sulfur oxychloride. Accordingly, when the sulfur oxychloride is consumed, the sulfur dioxide is dissolved in the co-solvent and reduced at a potential less than the reduction potential of the oxychloride so that there is a detectable change in its state.

The Takeda et al. U.S. Pat. No. 4,376,810 discloses an alkaline cell which comprises a zinc-indium-mercury alloy anode and in which there is an abrupt lowering of the cell discharge voltage to a distinctly lower voltage level after the zinc constituent has been consumed in order to indicate that the cell is near exhaustion and should be replaced.

The DeHaan et al. U.S. Pat. No. 4,388,380 discloses a lithium cell having a depletion gauge which includes a lithium anode comprising two lithium plates of different thickness and in which an electrical potential on a lead connected to the outer plate falls to zero volts when that lithium plate has been consumed to provide an indication of a predetermined level of discharge of the cell.

The Goebel U.S. Pat. No. 4,418,129 discloses a button type primary electrochemical cell which provides a warning indication toward the end of discharge of the cell and which includes an anode having first and second electrochemically active elements, such as lithium and calcium that have different oxidation potentials. The consumption of the active elements during discharge of the cell results in the establishment of different distinguishable operating voltages for the cell.

As will be described in greater detail hereinafter, the electrochemical cell of the present invention differs from the various electrochemical cells previously proposed by providing an end of life indication of the cell by a change in the voltage potential demonstrated by the cell as a result of partial depletion of the cathode material within the cell. The cathode material is a mixture of a metallic halogen compound and a metallic sulfide compound so that the first voltage potential can be developed between the metallic halogen compound and the anode material within the cell until the metallic halogen compound is depleted so that a second voltage potential different from the first voltage potential can be developed between the metallic sulfide compound and the anode material after the metallic halogen compound is depleted in order to indicate depletion of the metallic halogen compound and the approaching end of life of the cell.

SUMMARY OF THE INVENTION

According to the present invention there is provided an electrochemical cell comprising: an outer conductive housing, an anode material within said housing; a cathode material within said housing, said cathode material being a mixture of a metallic halogen compound and a metallic sulfide compound with no free sulfur in the cell, said metallic sulfide compound being less electrochemically reactive with said anode material than said metallic halogen compound; and porous insulating means with an electrolyte contained therein positioned between said anode material and said cathode material, a first voltage potential being developed between said metallic halogen compound and said anode material until said metallic halogen compound is depleted so that a second voltage potential different than the first voltage potential can be developed between said less reactive metallic sulfide compound and said anode material afer said metallic halogen compound is depleted in order to indicate depletion of said metallic halogen compound and the approaching end of life of said cell.

DESCRIPTION OF THE PREFERRED EMBODIMENT

Figure 1:
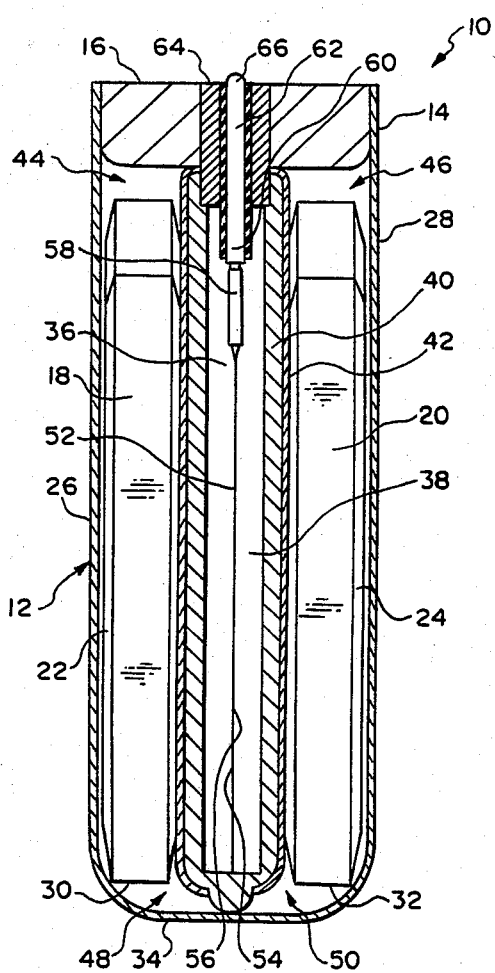
FIG. 1 is a vertical sectional view of an electrochemical cell having a cathode material mixture for providing an end of life indication of the cell in accordance with the teachings of the present invention.

Referring to FIG. 1, there is illustrated therein an electrochemical cell 10 having a cathode material mixture adapted to provide for an end of life indication of the electrochemical cell 10 and being constructed according to the teachings of the present invention.

The cell 10 includes a conductive housing 12 defined by an outer conductive case 14 which is fabricated from an electrically conductive material, such as stainless steel, and a lid member 16 which is also fabricated from an electrically conductive material and which is permanently fixed to the top of the conductive case 14 in order to provide a hermetically sealed conductive housing 12.

Two cathode plates 18, 20 are positioned within the conductive case 14 and include two major contact surfaces 22, 24 which are in direct electrical contact with sidewalls 26, 28 of the conductive case 14, and further include lower contact surfaces 30, 32 which are in direct electrical contact with a bottom wall 34 of the conductive case 14.

Interposed between the two cathode plates 18, 20 are two lithium anode plates 36, 38 which are spaced from the cathode plates 18, 20 and held tightly together in side-by-side configuration by an inner insulative separator 40 and an outer insulative separator 42. The insulative separators 40, 42 are made of a porous material, preferably polyethylene, serve to store electrolyte, preferably lithium perchlorate dissolved in a mixture of dioxolane, 1,2-dimethoxy ethane and 3,5-dimethylisoxazole, and electrically insulate the anode plates 36, 38 from the cathode plates 18, 20. The electrolyte also fills an area 44, 46 located below the lid member 16 and above upper end portions of the cathode plates 18, 20, and the upper portions of the outer insulative separator 42 and between portions of the side walls 26, 28 of the conductive case 14, as well as an area 48, 50 defined above the bottom wall 34 of the conductive case 14 and below lower end portions of the cathode plates 18, 20 and a lower portion of the outer insulative separator 42 and between the lower portions of the side walls 26, 28 of the conductive case 14.

The anode plates 36, 38 abut a current collector 52, and are in direct electrical contact therewith by major contact surfaces 54, 56 of each of the anode plates 36, 38 respectively. The current collector 52 includes a distal end 58 which is in direct electrical contact with the distal end 60 of an anode lead member 62 which extends through both of the insulative separators 40, 42 and through the lid member 16, as well as through a glass to metal sealing member 64 which insulates the anode lead member 62 from the cathode plates 18, 20 and the lid member 16. The proximal end 66 of the anode lead member 62 forms a negative terminal for the cell 10.

According to the teachings of the present invention, the cathode plates 18, 20 are made of a mixture of a metallic halogen compound, preferably cupric fluoride, and a less anode reactive metallic sulfide compound such as cupric sulfide. The cathode material is preferable a mixture of 80 Mole % cupric fluoride and 20 Mole % cupric sulfide, although it is apparent that other ratios of concentration of cupric fluoride and cupric sulfide could be utilized to enable the discharge of the cell 10 to indicate different percentages of depletion.

It will be apparent that a first voltage potential will be developed between the cupric fluoride compound and the anode plates 36, 38 as a result of reduction of the cupric fluoride until the cupric fluoride is depleted at which time a second voltage potential less than the first voltage potential is developed between the cupric sulfide and the anode plates 36,38. The drop to the second voltage potential indicates depletion of the cupric fluoride and the approaching end of life of the cell 10.

Figure 2:
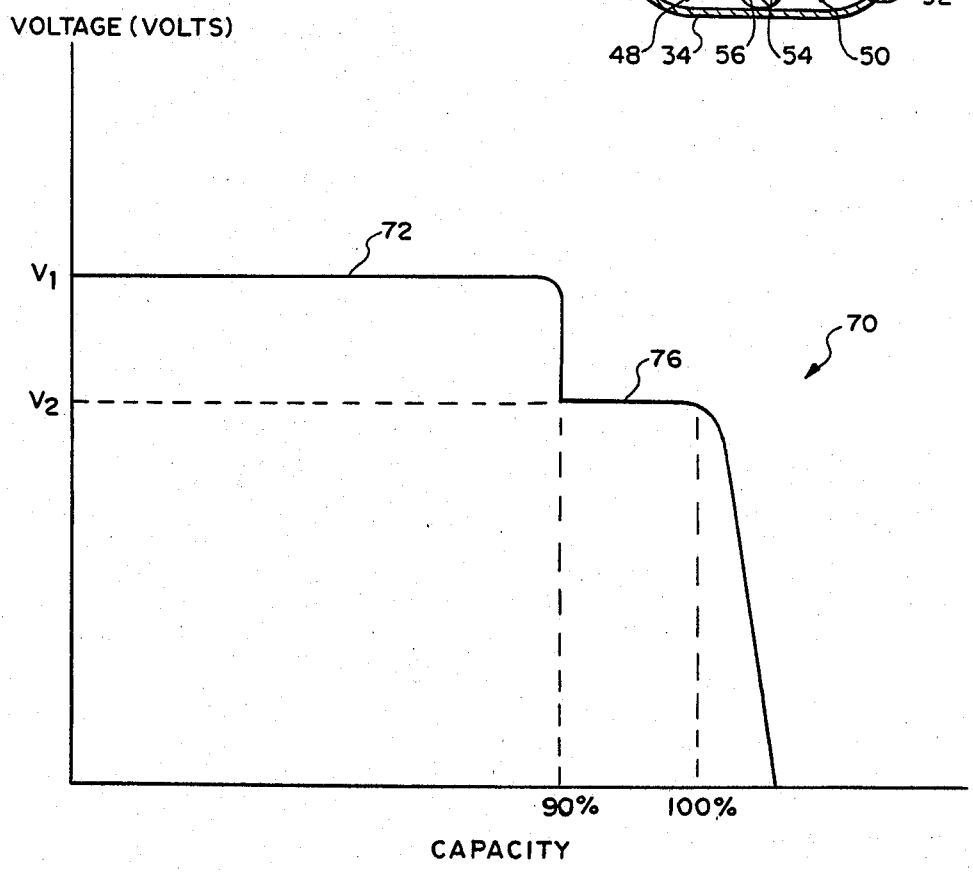
FIG. 2 is a graph showing the discharge characteristics of the cell shown in FIG. 1.

Such depletion of the cupric fluoride of the cathode plates 18,20 as indicated by the voltage drop is illustrated in the graph 70 shown in FIG. 2 which represents the continuous discharge characteristics of the cell 10 in accordance with the teachings of the present invention.

As shown by the graph 70, $V_1$ having a value of 3.4 volts, represents the first voltage potential developed between the cupric fluoride of the cathode plates 18,20 and the anode plates 36,38, and $V_2$, having a value of 2.1 volts, represents the second voltage potential developed between the cupric sulfide compound of the cathode plates 18,20 and the anode plates 36,38 after the cupric fluoride compound of the cathode plates 18,20 has been completely reduced. The line 72 of the graph 70 represents the first voltage potential. When the cupric fluoride of the cathode plates 18,20 is completely reduced, the voltage potential drops to the second voltage potential $V_2$ represented by line 76.

It is apparent that one of the advantages of the present invention is that an electrochemical cell having only a metallic halogen cathode does not provide an end of life indicator for an electrochemical cell. Accordingly, by providing a cathode comprising a mixture of cupric fluoride and cupric sulfide, end of life of the electrochemical cell 10 of the present invention is indicated by the voltage drop demonstrated when the cupric fluoride is completely reduced.

Furthermore, since cupric sulfide, instead of carbon powder, is mixed with cupric fluoride in order to form the cathode plates 36,38 thereof, conductivity of the cathode plates 36,38 will be increased as well as to provide a low impedance electrochemical cell 10.

Accordingly, the electrochemical cell 10 of the present invention having a cathode material mixture comprising cupric fluoride and cupric sulfide has a number of advantages, some of which have been described above, and others of which are inherent in the invention. Also, modifications can be made to the electrochemical cell 10 and the cathode material mixture without departing from the teachings of the present invention. Accordingly, the scope of the invention is only to be limited as necessitated by the accompanying claims.

1. An electrochemical cell comprising: an outer conductive housing, an lithium anode within said housing; a cathode material within said housing, said cathode material being a mixture of a low conductivity cupric halide and a higher conductivity cupric sulfide with no free sulfur in the cell, said cupric sulfide being less electrochemically reactive with said anode material than said cupric halide; and porous insulating means with a non-aqueous electrolyte contained therein positioned between said anode material and said cathode material, a first voltage potential being developed between said cupric halide and said anode material until said cupric halide is depleted so that a second voltage potential different than the first voltage potential can be developed between said less reactive cupric sulfide and said anode material after said cupric halide is depleted in order to indicate depletion of said cupric halide and the approaching end of life of said cell.

2. The cell of claim 1 wherein said cupric halide is cupric fluoride.

3. The cell of claim 2 wherein the ratio of cupric fluoride to cupric sulfide is 80 Mole % cupric fluoride to 20 Mole % cupric sulfide.

4. The cell of claim 1 wherein said electrolyte is lithium perchlorate dissolved in a mixture of dioxolane, 1,2 dimethoxy ethane and 3,5 diemthylisoxazole.

5. The cell of claim 1 wherein said second voltage potential is less than said first voltage potential.

6. The cell of claim 1 wherein the first voltage potential is approximately 3.4v and the second voltage potential is approximately 2.1v.

* * * * *